United States Patent
Matsushita

(10) Patent No.: US 10,643,831 B2
(45) Date of Patent: May 5, 2020

(54) VACUUM PROCESSING APPARATUS AND MASS SPECTROMETER

(71) Applicant: SHIMADZU CORPORATION, Kyoto-shi, Kyoto (JP)

(72) Inventor: Tomoyoshi Matsushita, Manchester (GB)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 7 days.

(21) Appl. No.: 15/777,368

(22) PCT Filed: Nov. 20, 2015

(86) PCT No.: PCT/JP2015/082744
§ 371 (c)(1),
(2) Date: Oct. 23, 2018

(87) PCT Pub. No.: WO2017/085875
PCT Pub. Date: May 26, 2017

(65) Prior Publication Data
US 2019/0066990 A1 Feb. 28, 2019

(51) Int. Cl.
*H01J 49/04* (2006.01)
*G01N 27/62* (2006.01)
(Continued)

(52) U.S. Cl.
CPC .......... *H01J 49/0418* (2013.01); *G01N 27/62* (2013.01); *H01J 49/0409* (2013.01);
(Continued)

(58) Field of Classification Search
None
See application file for complete search history.

(56) References Cited

U.S. PATENT DOCUMENTS

2007/0103660 A1* 5/2007 Tanaka ............... G03F 7/70716
355/53
2011/0147609 A1* 6/2011 Shichi .................. H01J 27/26
250/400

FOREIGN PATENT DOCUMENTS

CN 102903593 A 1/2013
JP 61267245 A 11/1986
(Continued)

OTHER PUBLICATIONS

Communication dated Mar. 28, 2019 from the State Intellectual Property Office of People's Republic of China in application No. 201580084663.9.

(Continued)

*Primary Examiner* — Andrew Smyth
(74) *Attorney, Agent, or Firm* — Sughrue Mion, PLLC

(57) ABSTRACT

A vacuum processing apparatus 100 includes: a vacuum chamber 1; a stage 2 placed inside the vacuum chamber 1, on which an object to be processed is placed; an internal guide rail 31 laid in the vacuum chamber 1 to guide the stage 2; a through-hole 103 made in a sidewall 102 of the vacuum chamber 1; a connecting rod 4 coupled to the stage 2 at one end and inserted in the through-hole 103, the other end being disposed outside the vacuum chamber 1; a movable member 5 connected to the other end of the connecting rod 4; a driving mechanism 8 disposed outside the vacuum chamber 1 to move the movable member 5; and a bellows 6 disposed between the movable member 5 and the sidewall 102, the bellows 6 following the movement of the movable member 5 while maintaining airtightness of the vacuum chamber 1.

8 Claims, 3 Drawing Sheets

(51) Int. Cl.
*H01J 49/16* (2006.01)
*H01J 49/00* (2006.01)
(52) U.S. Cl.
CPC ......... *H01J 49/161* (2013.01); *H01J 49/0004* (2013.01); *H01J 2237/2006* (2013.01); *H01J 2237/20221* (2013.01); *H01J 2237/20278* (2013.01)

(56) References Cited

FOREIGN PATENT DOCUMENTS

| JP | 63266744 A | * | 11/1988 |
|---|---|---|---|
| JP | 63266744 A | | 11/1988 |
| JP | 08162057 A | | 6/1996 |
| JP | 2011-002389 A | | 1/2011 |
| JP | 2012-219992 A | | 11/2012 |

OTHER PUBLICATIONS

International Search Report for PCT/JP2015/082744, dated Dec. 22, 2015.
Written Opinion for PCT/JP2015/082744, dated Dec. 22, 2015.
International Preliminary Report on Patentability for PCT/JP2015/082744, dated May 22, 2018.
Communication dated Jan. 8, 2019 from the Japanese Patent Office in application No. 2017-551499.
Communication dated Oct. 11, 2019 from the European Patent Office in application No. 15908814.5.

* cited by examiner

VACUUM PROCESSING APPARATUS AND MASS SPECTROMETER

CROSS REFERENCE TO RELATED APPLICATIONS

This Application is a National Stage of International Application No. PCT/JP2015/082744 filed Nov. 20, 2015.

TECHNICAL FIELD

The present invention relates to a technique for moving an object in a vacuum chamber.

BACKGROUND ART

In a mass spectrometer, a sample as an object is irradiated with a laser beam to ionize the sample in a vacuum chamber, the ionized substance is extracted by an extraction electrode to which a high voltage is applied, and accelerated. Based on the mass-to-charge ratio of the ions calculated from the flight time of the ions, a mass spectrum is obtained. In the mass spectrometer, an imaging process may be performed in which mass spectral information on each measurement point on the sample is acquired while the sample is moved in a horizontal plane in the vacuum chamber, and an image of a molecular distribution in the sample is displayed based on the acquired mass spectrum information. In this case, when the height of the measurement point varies from point to point, the accuracy of process is impaired. This is because, when the height of the sample in the vacuum chamber is deviated from a predetermined position, the position from which the ion starts to fly is deviated from the predetermined position, and the flight time is not correctly measured (and therefore the mass-to-charge ratio is not correctly identified).

When an object is to be moved in a horizontal plane in a vacuum chamber, like the mass spectrometer that performs the imaging, in many cases, a guide rail is laid on a floor of the vacuum chamber, a stage that holds the object is disposed on the guide rail, and a driving mechanism that drives the stage is coupled to the stage. According to this configuration, the stage that holds the object is moved while guided by the rails laid on the floor, so that the positional deviation in the height direction of the object hardly occurs.

In general, in order to maintain airtightness of a vacuum chamber, the mechanism that moves the stage in the vacuum chamber and the driving source such as a motor are accommodated within the vacuum chamber. However, a component that generates heat, such as a motor, easily rises in temperature in a vacuum chamber because no heat discharging means exists in the vacuum chamber except for heat conduction. For example, Patent Literatures 1 and 2 disclose a configuration in which a motor that drives the stage is disposed outside the vacuum chamber.

CITATION LIST

Patent Literature

Patent Literature 1: JP 2011-2389 A
Patent Literature 2: JP 2012-219992 A

SUMMARY OF INVENTION

Technical Problem

In Patent Literatures 1 and 2, the motor is disposed outside a vacuum chamber, and an end of a rotation shaft extending from the motor is introduced in the vacuum chamber through a through-hole made in a sidewall of the vacuum chamber. At the end of the rotation shaft that is introduced in the vacuum chamber, a transmission mechanism (for example, in Patent Literature 1, a ball screw mechanism that converts driving force of an X motor into linear motion along the X axis of the stage and a rack-and-pinion mechanism that converts driving force of a Y motor into linear motion along the Y axis of the stage) is connected. By this transmission mechanism, the driving force of the motor is converted into a linear motion of the stage placed inside the vacuum chamber.

However, according to the above configuration, emission of gas (outgas) from a resin member or lubricating oil used in the transmission mechanism placed in the vacuum chamber is a problem. Further, according to the above configuration, the rotating shaft extending from the motor is inserted in the through-hole in the sidewall of the vacuum chamber. In order to allow the rotation of the rotating shaft while the airtightness of the vacuum chamber is maintained, it is necessary to bring the through-hole and the rotation shaft as close as possible with a lubricant, such as grease, between them to keep the airtightness. The lubricant also becomes a source of the outgas.

When the outgas is generated, the vacuum of the vacuum chamber is deteriorated. Thus, it is necessary to perform baking to accelerate vaporization of the outgas, which also deteriorates the throughput and the running cost of the apparatus.

Although the mass spectrometer is described above as an example, the above problem arises generally in the vacuum processing apparatus that performs processing while moving the object in the vacuum chamber.

An object to be solved by the present invention is to provide a technology capable of adequately suppressing the generation of the outgas in moving an object in a vacuum chamber.

Solution to Problem

According to one aspect of the present invention, a vacuum processing apparatus includes:
a vacuum chamber;
a stage disposed inside the vacuum chamber, on which an object to be processed is placed:
an internal guide rail laid in the vacuum chamber to guide the stage;
a through-hole made in a sidewall of the vacuum chamber;
a connecting rod coupled to the stage at one end and inserted in the through-hole, the other end being disposed outside the vacuum chamber;
a movable member connected to the other end of the connecting rod;
a driving mechanism disposed outside the vacuum chamber to move the movable member:
and
a bellows disposed between the movable member and the sidewall, the bellows following the movement of the movable member while maintaining airtightness of the vacuum chamber.

The movable member is disposed outside the vacuum chamber, and the movable member and the stage disposed inside the vacuum chamber are coupled by the connecting rod inserted in the through-hole made in the sidewall of the vacuum chamber. When the movable member is driven by the driving mechanism disposed outside the vacuum chamber and moved outside the vacuum chamber, the stage moves in the vacuum chamber while being guided by the internal guide rail according to the movement of the movable member. According to this configuration, the driving mechanism (for example, a driving source such as a motor and a transmission mechanism that converts the driving force into linear motion or the like) is disposed outside the vacuum chamber, so that the outgas from the resin member or lubricating oil used in the transmission mechanism does not cause a problem. Although the through-hole in which the connecting rod is inserted is made in the sidewall of the vacuum chamber, the bellows is provided between the movable member and the sidewall (that is, outside of the vacuum chamber, a periphery of the connecting rod is surrounded by the bellows). Consequently, it is unnecessary to adopt a configuration in which the connecting rod and the through-hole are brought into tight contact with each other and grease or the like is used to make the airtightness. For this reason, there arises no problem of the outgas from a lubricant such as grease. Thus, the generation of the outgas can adequately be suppressed in the vacuum chamber.

Preferably, the vacuum processing apparatus further includes: an external guide rail laid outside the vacuum chamber to guide the movable member; and a common base extending across an inside and an outside of the vacuum chamber, the internal guide rail and the external guide rail being installed on an upper surface of the common base.

In this aspect, the internal guide rail that guides the stage in the vacuum chamber and the external guide rail that guides the movable member in the outside of the vacuum chamber are installed on the common base. Thus, the mutual positional relationship between the internal guide rail and the external guide rail can be adjusted with high accuracy.

Preferably, in the vacuum processing apparatus, the internal guide rail includes:

a first internal guide rail laid along a first direction parallel to an extending direction of the connecting rod; and a second internal guide rail laid along a second direction crossing the first direction, the driving mechanism includes:

a first driving mechanism that moves the movable member along the first direction; and a second driving mechanism that moves the movable member along the second direction, and a width of the through-hole along the second direction is larger than a moving range of the connecting rod along the second direction.

In this aspect, the stage can be moved in the first direction and the second direction crossing the first direction.

The present invention can be applied to a mass spectrometer.

According to another aspect of the present invention, a mass spectrometer includes:

a vacuum chamber;

a stage disposed inside the vacuum chamber, on which an object to be processed is placed;

an internal guide rail laid in the vacuum chamber to guide the stage;

a through-hole made in a sidewall of the vacuum chamber;

a connecting rod coupled to the stage at one end and inserted in the through-hole, the other end being disposed outside the vacuum chamber;

a movable member connected to the other end of the connecting rod;

a driving mechanism disposed outside the vacuum chamber to move the movable member;

and a bellows disposed between the movable member and the sidewall, the bellows following the movement of the movable member while maintaining airtightness of the vacuum chamber.

Advantageous Effects of Invention

In the vacuum processing apparatus of the present invention, the movable member is disposed outside the vacuum chamber, and the movable member is driven by the driving mechanism disposed outside the vacuum chamber and moved outside the vacuum chamber. In the vacuum chamber, the stage coupled to the movable member with the connecting rod interposed between them moves while being guided by the internal guide rail according to the movement of the movable member. According to this configuration, the driving mechanism is disposed outside the vacuum chamber, so that the generation of the outgas can adequately be suppressed in the vacuum chamber.

DESCRIPTION OF EMBODIMENTS

Hereinafter, preferred embodiments of the present invention will be described with reference to the drawings.

1. Vacuum Processing Apparatus 100 of Embodiment

Figure 1:
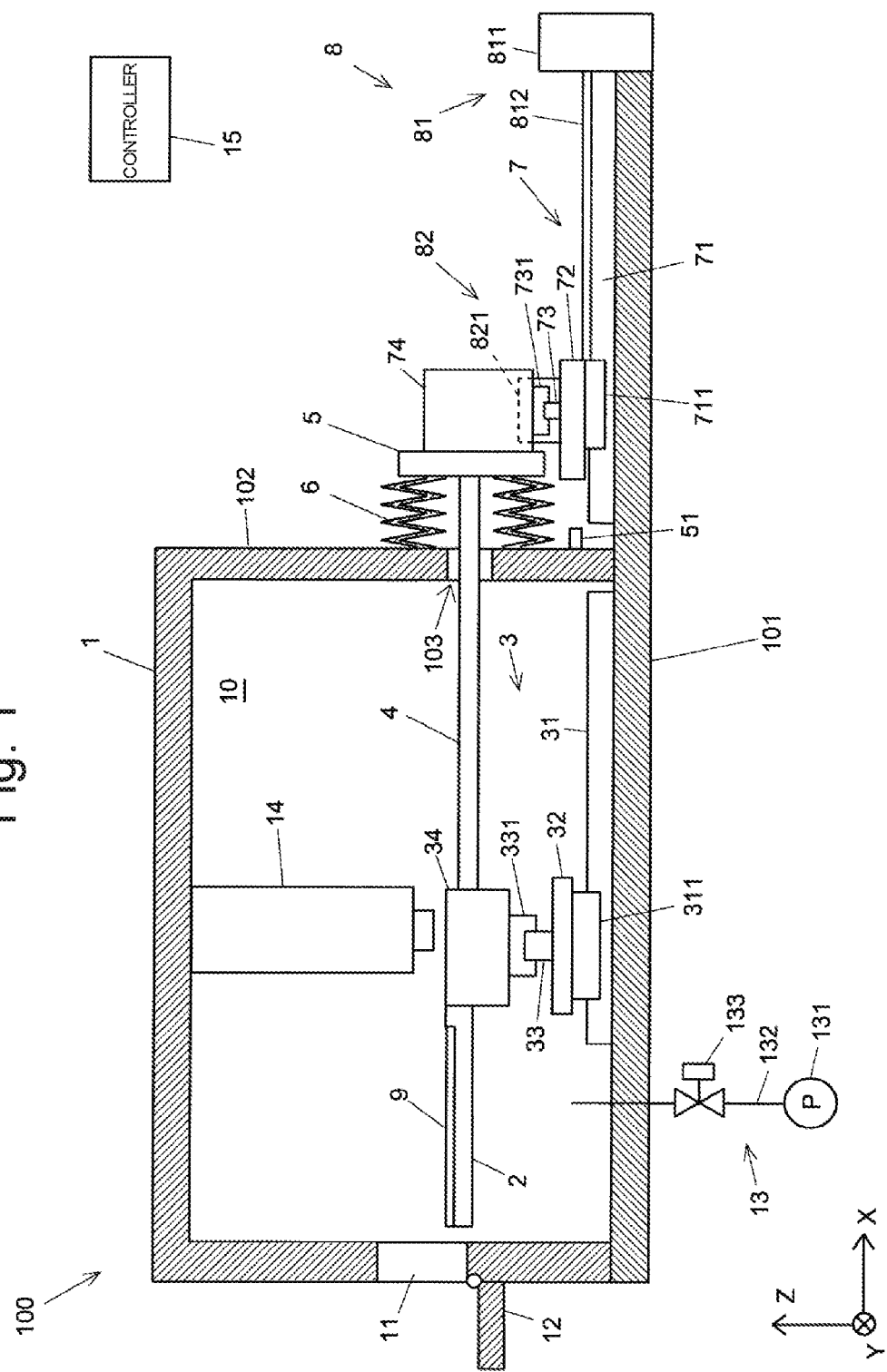
FIG. 1 is a longitudinal sectional view illustrating a part of a mass spectrometer.
Figure 2:
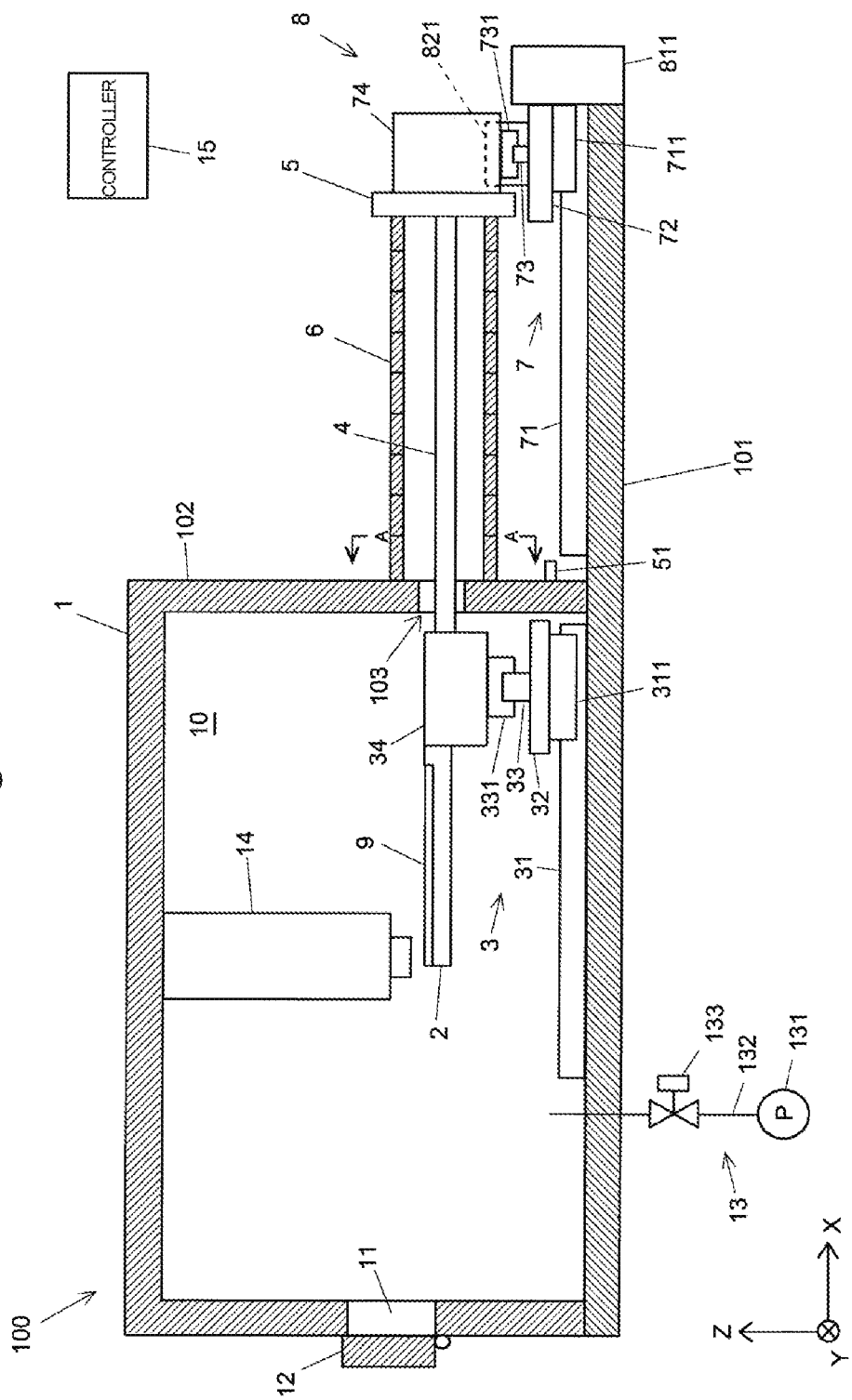
FIG. 2 is a longitudinal sectional view illustrating a part of the mass spectrometer.

A mass spectrometer 100 according to an embodiment will be described with reference to FIGS. 1 and 2. FIGS. 1 and 2 are side sectional views illustrating a part of the mass spectrometer 100.

The mass spectrometer 100 irradiates an object (specifically, a sample to be analyzed) with a laser beam under vacuum to perform ionization, and separates and detects flying ions according to a mass-to-charge ratio. Herein, the sample to be analyzed by the mass spectrometer 100 is placed on a sample plate 9 in advance. Specifically, the sample plate 9 is a tabular member, and a plurality of recesses are formed on a top surface of the sample plate 9. The sample is dropped on each of the plurality of recesses, whereby the sample is held on the sample plate 9.

The mass spectrometer 100 includes a vacuum chamber 1. The vacuum chamber 1 includes an insertion port 11 through which the sample plate 9 is inserted in an internal space 10 of the vacuum chamber 1, and a door 12 that opens and closes the insertion port 11. An evacuation system 13 that evacuates the internal space 10 is coupled to the internal space 10. The evacuation system 13 includes a pipe 132 in which one end is connected to the internal space 10 while the other end is connected to a vacuum pump 131, and a valve 133 interposed in the pipe 132. When the door 12 is closed, the internal space 10 becomes a closed space. At this point, when the valve 133 is opened while the vacuum pump 131 is driven, the internal space 10 becomes a vacuum state.

The internal space 10 is a processing space in which a mass spectrometry process is performed, and an extraction electrode 14 that extracts an ionized substance and a stage 2 on which the sample plate 9 is placed are disposed in the internal space 10. In the internal space 10, the stage 2 is supported by a supporting member 34 (to be described later) in a posture in which the top surface of the stage 2 becomes horizontal. A process of irradiating a sample on the sample plate 9 placed on the stage 2 with the laser beam from a laser beam source (not illustrated) to ionize the sample and of extracting the ionized substance using the extraction electrode 14 is performed in the internal space 10. However, the process is performed while the internal space 10 is depressurized to predetermined vacuum. As described above, in the sample plate 9, the sample is held in each of the plurality of recesses. In order to sequentially irradiate the sample held in each recess with the laser beam, the process is performed while the stage 2 is moved with respect to the laser beam source (a mechanism for moving the stage 2 will be described later). The substance extracted by the extraction electrode 14 is accelerated, separated according to the mass-to-charge ratio, and detected (the configuration relating to the separation and the detection is not illustrated). The mass spectrometer 10) includes a controller 15 that controls each unit of the mass spectrometer 10X), and a series of processes performed by the mass spectrometer 100 is performed under the control of the controller 15.

2. Mechanism that Moves Stage 2

Figure 3:
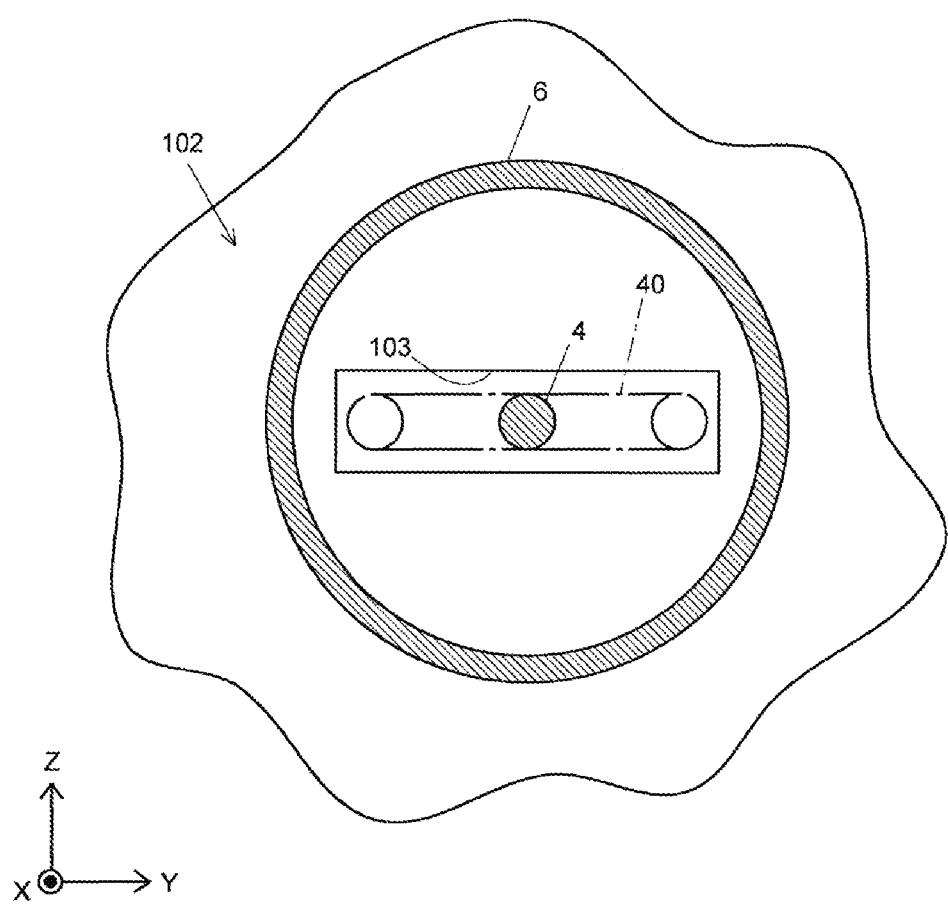
FIG. 3 is a sectional view of the mass spectrometer when the mass spectrometer is viewed from a direction of an arrow A in FIG. 2.

The mass spectrometer 100 includes the mechanism that moves the stage 2 in a horizontal plane (specifically, for example, in two orthogonal axes directions (an X direction and a Y direction) defined in the horizontal plane) in the internal space 10. The mechanism will be described with reference to FIG. 3, in addition to FIGS. 1 and 2. FIG. 3 is a sectional view of the mass spectrometer 100 when the mass spectrometer 100 is viewed in a direction of arrow A in FIG. 2.

<i. Configuration 3 that Guides Stage 2 in Internal Space 10>

The mass spectrometer 100 includes a configuration 3 that guides the stage 2 in the internal space 10.

That is, a guide rail (internal X guide rail) 31 extending along an X axis in the horizontal plane is laid in the vacuum chamber 1. The internal X guide rail 31 is a rail that guides the stage 2 in the X direction. Specifically, the internal X guide rail 31 is laid in a portion disposed in the vacuum chamber 1 on the top surface of a base (common base) 101 that straddles an inside and an outside of the vacuum chamber 1. An internal base member 32 is disposed on the internal X guide rail 31 with a bearing (for example, a ball bearing) 311 sandwiched between them, and the internal base member 32 (eventually, the stage 2 indirectly supported by the internal base member 32 with members 33, 331, 34 interposed between them) can move smoothly along the internal X guide rail 31 in the horizontal plane.

A guide rail (internal Y guide rail) 33 extending along the Y axis in the horizontal plane is laid on the top surface of the internal base member 32. The internal Y guide rail 33 is a rail that guides the stage 2 in the Y direction. A supporting member 34 that supports the stage 2 is disposed on the internal Y guide rail 33 with a bearing (for example, a ball bearing) 331 interposed between them, and the supporting member 34 (eventually, the stage 2 supported by the supporting member 34) can move smoothly along the internal Y guide rail 33 in the horizontal plane.

<ii. Connection Rod 4, Movable Member 5, Bellows 6>

One end of a connecting rod 4 extending along the X axis is connected to the supporting member 34 supporting the stage 2. That is, the stage 2 is coupled to the connecting rod 4 with the supporting member 34 interposed between them. The connecting rod 4 is inserted in a through-hole 103 made in a sidewall 102 of the vacuum chamber 1, and the other end of the connecting rod 4 is disposed outside the vacuum chamber 1.

An end of the connecting rod 4 on the side disposed outside the vacuum chamber 1 is coupled to a movable member 5. For example, the movable member 5 is a tabular member. A bellows 6 that follows the movement (movement in the X direction and movement in the Y direction) of the movable member 5 is disposed between the movable member 5 and the sidewall 102 of the vacuum chamber 1 while airtightness of the vacuum chamber 1 is maintained. That is, one end of the bellows 6 is screwed to an outer wall surface of the sidewall 102 of the vacuum chamber 1 so as to surround an opening end of the through-hole 103, and the other end of the bellows 6 is screwed to a surface of the movable member 5 on the side opposed to the outer wall surface so as to surround a bonded portion of the connecting rod 4.

As will become apparent later, the movable member 5 is driven by the driving mechanism 8, and moved in the X direction and the Y direction. The through-hole 103 is made into a size such that the movement of the movable member 5 is not obstructed by the connecting rod 4. Specifically, as illustrated in FIG. 3, the through-hole 103 is made larger than a moving range 40 of the connecting rod 4 (that is, a moving range of the connecting rod 4 in the Y direction according to a moving range of the movable member 5 in the Y direction) with respect to a direction (in the illustrated example, the Y direction) orthogonal to an extending direction of the connecting rod 4. That is, a width of the through-hole 103 in the Y direction is larger than the moving range 40. A shape of the through-hole 103 is not limited to a square illustrated in the drawing, but the through-hole 103 may be a circular opening, for example.

A sensor (X sensor) 51 that detects a position of the movable member 5 in the X direction and a sensor (Y sensor) (not illustrated) that detects a position of the movable member 5 in the Y direction are disposed outside the vacuum chamber 1. The movable member 5 is coupled to the stage 2 with the connecting rod 4 interposed between them (that is, the relative positional relationship between the movable member 5 and the stage 2 is fixed), so that the position of the stage 2 can be specified by specifying the position of the movable member 5. The X sensor 51 and the Y sensor are electrically connected to the controller 15, and the controller 15 controls rotation numbers and the like of the X motor 811 and the Y motor 821 (to be described later) based on information acquired from each sensor, thereby moving the stage 2 to a desired position.

<iii. Configuration 7 that Guides Movable Member 5>

The mass spectrometer 100 includes a configuration 7 that guides the movable member 5 in the outside of the vacuum chamber 1.

That is, a guide rail (external X guide rail) 71 extending along the X axis in the horizontal plane is laid outside the vacuum chamber 1. The external X guide rail 71 is a rail that guides the movable member 5 in the X direction. Specifically, the external X guide rail 71 is laid in a portion disposed outside the vacuum chamber 1 on the top surface of the common base 101. An external base member 72 is disposed on the external X guide rail 71 with a bearing (for example, a ball bearing) 711 sandwiched between them, and the external base member 72 (eventually, the movable member 5 indirectly supported by the external base member 72 with members 73, 731, 74 interposed between them) can move smoothly along the external X guide rail 71 in the horizontal plane.

The guide rail (external Y guide rail) 73 extending along the Y axis in a horizontal plane is laid on the top surface of the external base member 72. The external Y guide rail 73 is a rail that guides the movable member 5 in the Y direction. A supporting member 74 that supports the movable member 5 is disposed on the external Y guide rail 73 with a bearing (for example, a ball bearing) 731 interposed between them, and the supporting member 74 (eventually, the movable member 5 supported by the supporting member 74) can move smoothly along the external Y guide rail 73 in the horizontal plane.

<iv. Driving Mechanism 8 of Movable Member 5>

A driving mechanism 8 that move the movable member 5 is disposed outside the vacuum chamber 1. The driving mechanism 8 includes an X driving mechanism 81 that moves the movable member 5 along the X axis and a Y driving mechanism 82 that moves the movable member 5 along the Y axis.

The X driving mechanism 81 includes a motor (X motor) 811 as a driving source and a transmission mechanism 812 that converts rotational motion of the X motor 811 into linear motion of the external base member 72 along the X axis. For example, the X motor 811 is disposed at an end of the external X guide rail 71. Thus, the transmission mechanism that converts the rotational motion of the X motor 811 into the linear motion along the X axis can be constructed with a simple configuration such as a ball screw mechanism.

When the X motor 811 rotates in response to an instruction of the controller 15, the rotation motion of the X motor 811 is converted into the linear motion by the transmission mechanism 812, and the external base member 72 (eventually, the movable member 5 indirectly supported by the movable base member 72) moves smoothly in the horizontal plane along the external X guide rail 71. The movable member 5 is coupled to the stage 2 with the connecting rod 4 interposed between them. Consequently, when the movable member 5 moves in the X direction, the stage 2 follows the movable member 5 to move smoothly in the horizontal plane along the internal X guide rail 31. Since a movement amount of the stage 2 in the X direction is equal to a movement amount of the movable member 5 in the X direction, the movement amount of the stage 2 in the X direction can be controlled by controlling a rotation amount of the X motor 811.

The Y driving mechanism 82 includes a motor (Y motor) 821 as a driving source and a transmission mechanism (not illustrated) that converts the rotational motion of the Y motor 821 into the linear motion of the movable member 5 along the Y axis. For example, the Y motor 821 is disposed on the external base member 72 at the end of the external Y guide rail 73. Thus, the transmission mechanism that converts the rotational motion of the Y motor 821 into the linear motion along the Y axis can be constructed with a simple configuration such as a ball screw mechanism.

When the Y motor 821 rotates in response to an instruction from the controller 15, the rotation motion of the Y motor 821 is converted into the linear motion by the transmission mechanism, and the supporting member 74 (eventually, the movable member supported by the supporting member 74) moves smoothly in the horizontal plane along the external Y guide rail 73. The movable member 5 is coupled to the stage 2 with the connecting rod 4 interposed between them. Consequently, when the movable member 5 moves in the Y direction, the stage 2 follows the movable member 5 to move smoothly in the horizontal plane along the internal Y guide rail 33. Similarly to the X direction, the movement amount of the stage 2 in the Y direction is equal to the movement amount of the movable member 5 in the Y direction, so that the movement amount of the stage 2 in the Y direction can be controlled by controlling the rotation amount of the Y motor 821.

3. Effect

According to the above embodiment, the driving mechanism (for example, a driving source such as a motor and a transmission mechanism that converts the driving force into the linear motion or the like) is disposed outside the vacuum chamber 1, so that the outgas from the resin member or lubricating oil used in the transmission mechanism does not cause a problem. Although the through-hole 103 in which the connecting rod 4 is inserted is made in the sidewall 102 of the vacuum chamber 1, the bellows 6 is provided between the movable member 5 and the sidewall 102 (that is, outside of the vacuum chamber 1, a periphery of the connecting rod 4 is surrounded by the bellows 6). Consequently, it is unnecessary to adopt a configuration in which the connecting rod 4 and the through-hole 103 are brought into tight contact with each other and grease or the like is used to make the airtightness. For this reason, there arises no problem of the outgas from a lubricant such as grease. Thus, generation of outgas can adequately be suppressed in the vacuum chamber 1. As a result, it is unnecessary to perform baking, and time required to depressurize the internal space 10 to predetermined vacuum can be shortened.

In the above embodiment, the sensors (the X sensor 51 and the Y sensor) that may be a generation source of the outgas are also disposed outside the vacuum chamber 1. Thus, the generation of the outgas caused by the sensor can be suppressed in the vacuum chamber 1.

In the above embodiment, the X motor 811 and the Y motor 821 are disposed outside the vacuum chamber 1, so that temperature is hardly raised as compared with the case that the X motor 811 and the Y motor 821 are disposed in the vacuum chamber 1. For this reason, it is unnecessary to limit the value of a current passed through the motor in order to suppress a rise of the motor temperature. Thus, a moving speed of the stage 2 is not limited.

In the above embodiment, the driving mechanism 8, the X sensor 51, the Y sensor, and the like are disposed outside the vacuum chamber 1. Thus, ordinary components (that is, ordinary components that are not special components that can endure use in a vacuum environment) can be used as the components included in these units. Consequently, manufacturing cost of the mass spectrometer 100 can be suppressed.

In the above embodiment, the internal X guide rail 31 that guides the stage 2 in the vacuum chamber 1 and the external X guide rail 71 that guides the movable member 5 in the outside of the vacuum chamber 1 are installed on the common base 101. According to this configuration, the internal X guide rail 31 and the external X guide rail 71 are laid on the base 101 by machining, and thus a mutual positional relationship (mutual parallelism, horizontally, and the like) can be adjusted with high accuracy (that is, by machining accuracy). In the case that the positional relationship between the internal X guide rail 31 and the external X guide rail 71 is not accurately adjusted, there is a possibility that the guide rails may be distorted or worn unevenly and, in the worst-case scenario, the stage may not move unless play is provided in the connecting rod 4 connecting the stage 2 and the movable member 5. In the embodiment, the positional relation between the internal X guide rail 31 and the external X guide rail 71 can be adjusted with high accuracy, so that the above problem does not arise even if the play is not provided in the connecting rod 4.

4. Other Embodiments

In the above embodiment, the movable member 5 is coupled to the end of the connecting rod 4. Alternatively, the movable member 5 and the connecting rod 4 may integrally be formed. In other words, the movable member 5 may be constructed with a part of the connecting rod 4. Specifically, for example, the end of the connecting rod 4 may be formed into a flange shape, and the flange-shaped portion may be used as the movable member. In this case, one end of the bellows is bonded to the flange-shaped portion.

In the above embodiment, the internal space 10 may be divided into a plurality of spaces. For example, the internal space 10 may be divided into a processing space in which the process is performed and a load lock space in which the sample plate 9 is transferred between the outside of the apparatus and the processing space. In this case, the load lock space is disposed between the insertion port 11 and the processing space. A gap between the processing space and the load lock space is partitioned by a gate valve or the like, and each space is independently switchable between the vacuum state and the atmospheric state.

In the above embodiment, the stage 2 is moved in two directions, namely, the X direction and the Y direction orthogonal to the X direction. However, the stage 2 may be moved only in the X direction or the Y direction, or the stage 2 may be moved in two directions that are not orthogonal to each other. Further, a configuration that moves the stage 2 in a vertical direction (Z direction) may further be provided. In the case that the stage 2 is moved only in the Y direction, preferably the internal Y guide rail and the external Y guide rail are laid on the common base 101. In the case that the stage 2 is moved in the vertical direction, a driving mechanism that moves the movable member 5 in the vertical direction may be added. When the movable member 5 is moved up and down in response to driving of the driving mechanism, the stage 2 is moved up and down by following the movable member 5.

In the above embodiment, the present invention is applied to the mass spectrometer. However, the present invention can be applied to various vacuum processing apparatuses other than the mass spectrometer.

REFERENCE SIGNS LIST

1 . . . Vacuum chamber
2 . . . Stage
3 . . . Configuration that guides stage
4 . . . Connecting rod
5 . . . Movable member
6 . . . Bellows
7 . . . Configuration that guides movable member
8 . . . Driving mechanism
9 . . . Sample plate
31 . . . Internal X guide rail
32 . . . Internal base member
33 . . . Internal Y guide rail
34 . . . Supporting member
71 . . . External X guide rail
72 . . . External base member
73 . . . External Y guide rail
74 . . . Supporting member
81 . . . X driving mechanism
82 . . . Y driving mechanism
100 . . . Mass spectrometer
101 . . . Common base
102 . . . Sidewall of vacuum chamber
103 . . . Through-hole
811 . . . X motor
812 . . . Transmission mechanism
821 . . . Y motor

The invention claimed is:

1. A vacuum processing apparatus comprising:
a vacuum chamber;
a stage disposed inside the vacuum chamber, on which an object to be processed is placed;
an internal guide rail laid in the vacuum chamber to guide the stage;
a through-hole made in a sidewall of the vacuum chamber;
a connecting rod coupled to the stage at one end and inserted in the through-hole, the other end being disposed outside the vacuum chamber;
a movable member connected to the other end of the connecting rod;
a driving mechanism disposed outside the vacuum chamber to move the movable member; and
a bellows disposed between the movable member and the sidewall, the bellows following a movement of the movable member while maintaining airtightness of the vacuum chamber, wherein
the internal guide rail includes:
a first internal guide rail laid along a first direction parallel to an extending direction of the connecting rod; and
a second internal guide rail laid along a second direction crossing the first direction, and
the driving mechanism includes:
a first driving mechanism that moves the movable member along the first direction; and
a second driving mechanism that moves the movable member along the second direction.

2. The vacuum processing apparatus according to claim 1, further comprising:
an external guide rail laid outside the vacuum chamber to guide the movable member; and
a common base extending across an inside and an outside of the vacuum chamber, the internal guide rail and the external guide rail being installed on an upper surface of the common base.

3. The vacuum processing apparatus according to claim 1, wherein
a width of the through-hole along the second direction is larger than a moving range of the connecting rod along the second direction.

4. The vacuum processing apparatus according to claim 2, wherein
a width of the through-hole along the second direction is larger than a moving range of the connecting rod along the second direction.

5. A mass spectrometer comprising:
a vacuum chamber;
a stage disposed inside the vacuum chamber, on which an object to be processed is placed;

an internal guide rail laid in the vacuum chamber to guide the stage;

a through-hole made in a sidewall of the vacuum chamber;

a connecting rod coupled to the stage at one end and inserted in the through-hole, the other end being disposed outside the vacuum chamber;

a movable member connected to the other end of the connecting rod;

a driving mechanism disposed outside the vacuum chamber to move the movable member; and a bellows disposed between the movable member and the sidewall, the bellows following a movement of the movable member while maintaining airtightness of the vacuum chamber, wherein the internal guide rail includes:
- a first internal guide rail laid along a first direction parallel to an extending direction of the connecting rod; and
- a second internal guide rail laid along a second direction crossing the first direction, and the driving mechanism includes:
- a first driving mechanism that moves the movable member along the first direction; and
- a second driving mechanism that moves the movable member along the second direction.

6. The mass spectrometer according to claim 5, further comprising:
   an external guide rail laid outside the vacuum chamber to guide the movable member; and
   a common base extending across an inside and an outside of the vacuum chamber, the internal guide rail and the external guide rail being installed on an upper surface of the common base.

7. The mass spectrometer according to claim 5, wherein a width of the through-hole along the second direction is larger than a moving range of the connecting rod along the second direction.

8. The mass spectrometer according to claim 6, wherein a width of the through-hole along the second direction is larger than a moving range of the connecting rod along the second direction.

* * * * *